(12) United States Patent
Jayaraman

(10) Patent No.: US 8,862,559 B2
(45) Date of Patent: Oct. 14, 2014

(54) SCALABLE MECHANISM FOR DETECTION OF COMMONALITY IN A DEDUPLICATED DATA SET

(75) Inventor: Vinod Jayaraman, San Francisco, CA (US)

(73) Assignee: Dell Products L.P., Round Rock, TX (US)

( * ) Notice: Subject to any disclaimer, the term of this patent is extended or adjusted under 35 U.S.C. 154(b) by 1002 days.

(21) Appl. No.: 12/574,580

(22) Filed: Oct. 6, 2009

(65) Prior Publication Data

US 2011/0082840 A1 Apr. 7, 2011

(51) Int. Cl.
*G06F 17/30* (2006.01)

(52) U.S. Cl.
CPC .............................. *G06F 17/30156* (2013.01)
USPC ............ 707/693; 707/694; 711/170; 709/247

(58) Field of Classification Search
USPC ................... 707/693, 694, 999.101; 711/170; 709/247
See application file for complete search history.

(56) References Cited

U.S. PATENT DOCUMENTS

| | | | | |
|---|---|---|---|---|
| 7,373,464 | B2 * | 5/2008 | Zhu et al. ....................... | 711/154 |
| 8,051,367 | B2 * | 11/2011 | Arai et al. ..................... | 714/807 |
| 2009/0019246 | A1 * | 1/2009 | Murase ......................... | 711/162 |
| 2010/0064166 | A1 * | 3/2010 | Dubnicki et al. ................. | 714/4 |
| 2010/0094817 | A1 * | 4/2010 | Ben-Shaul et al. ............ | 707/697 |
| 2011/0066628 | A1 * | 3/2011 | Jayaraman ..................... | 707/758 |

OTHER PUBLICATIONS

"Data Deduplication Assessment", *Iron Bow Technologies*, [Online], Retrieved from the Internet: < http://www.ironbow.com/pdf/new/Technology_Practice_Disciplines/Data_Center/DATA_DEDUP_ASSESSMENT.pdf >, Accessed on May 23, 2012,2 pgs.
Aronovich, Lior et al,, "The Design of a Similarity Based Deduplication System", *SYSTOR*, Haifa, Israel, [Online], Retrieved from the Internet: < http://www.cs.bgu.ac.il/~ebachmat/systor.pdf >,(2009),14 pgs.

* cited by examiner

*Primary Examiner* — Monica Pyo
(74) *Attorney, Agent, or Firm* — Kwan & Olynick LLP

(57) ABSTRACT

Mechanisms are provided for efficiently determining commonality in a deduplicated data set in a scalable manner regardless of the number of deduplicated files or the number of stored segments. Information is generated and maintained during deduplication to allow scalable and efficient determination of data segments shared in a particular file, other files sharing data segments included in a particular file, the number of files sharing a data segment, etc. Data need not be expanded or uncompressed. Deduplication processing can be validated and verified during commonality detection.

20 Claims, 8 Drawing Sheets

| Data A | Data B | Data C | File X 101 |
|---|---|---|---|

| Data D | Data B | Data C | File Y 103 |
|---|---|---|---|

| Data D | Data B | Data E | File Z 105 |
|---|---|---|---|

| Data A | Data B | Data C | File X 101 |
|--------|--------|--------|------------|
| Data D | Data B | Data C | File Y 103 |
| Data D | Data B | Data E | File Z 105 |

| Filemap File X 201 | | |
|---|---|---|
| Offset 203 | Index 205 | Lname 207 |
| 0K | 0.1 | NULL |
| 8K | 0.2 | NULL |
| 16K | 0.3 | NULL |

Figure 2B

| Datastore Suitcase 271 | | |
|---|---|---|
| | Data Table 251 | |
| Index 253 | Data Offset 255 | Data Reference Count 257 |
| 1 | Offset-Data A | 1 |
| 2 | Offset-Data B | 1 |
| 3 | Offset-Data C | 1 |
| | Datastore | |
| | Data 261 | Last File 263 |
| 1 | Data A | File X 201 |
| 2 | Data B | File X 201 |
| 3 | Data C | File X 201 |

Figure 3A

| Filemap File X 301 | | |
|---|---|---|
| Offset 303 | Index 305 | Lname 307 |
| 0K | 0.1 | NULL |
| 8K | 0.2 | NULL |
| 16K | 0.3 | NULL |

| Filemap File Y 311 | | |
|---|---|---|
| Offset 313 | Index 315 | Lname 317 |
| 0K | 0.4 | NULL |
| 8K | 0.2 | File X 301 |
| 16K | 0.3 | File X 301 |

Figure 3B

| Datastore Suitcase 371 | | |
|---|---|---|
| | Data Table 351 | |
| Index 353 | Data Offset 355 | Data Reference Count 357 |
| 1 | Offset-Data A | 1 |
| 2 | Offset-Data B | 2 |
| 3 | Offset-Data C | 2 |
| 4 | Offset-Data D | 1 |
| | Datastore | |
| | Data 361 | Last File 363 |
| 1 | Data A | File X 301 |
| 2 | Data B | File Y 311 |
| 3 | Data C | File Y 311 |
| 4 | Data D | File Y 311 |

Figure 4A

| Filemap File X 401 |||
|---|---|---|
| Offset 403 | Index 405 | Lname 407 |
| 0K | 0.1 | NULL |
| 8K | 0.2 | NULL |
| 16K | 0.3 | NULL |

| Filemap File Y 411 |||
|---|---|---|
| Offset 413 | Index 415 | Lname 417 |
| 0K | 0.4 | NULL |
| 8K | 0.2 | File X 401 |
| 16K | 0.3 | File X 401 |

| Filemap File Z 421 |||
|---|---|---|
| Offset 423 | Index 425 | Lname 427 |
| 0K | 0.4 | File Y 411 |
| 8K | 0.2 | File Y 411 |
| 16K | 0.5 | NULL |

Figure 4B

| Datastore Suitcase 471 | | |
|---|---|---|
| Data Table 451 | | |
| Index 453 | Data Offset 455 | Data Reference Count 457 |
| 1 | Offset-Data A | 1 |
| 2 | Offset-Data B | 3 |
| 3 | Offset-Data C | 2 |
| 4 | Offset-Data D | 2 |
| 5 | Offset-Data E | 1 |
| Datastore | | |
| | Data 461 | Last File 463 |
| 1 | Data A | File X 401 |
| 2 | Data B | File Z 421 |
| 3 | Data C | File Y 411 |
| 4 | Data D | File Z 421 |
| 5 | Data E | File Z 421 |

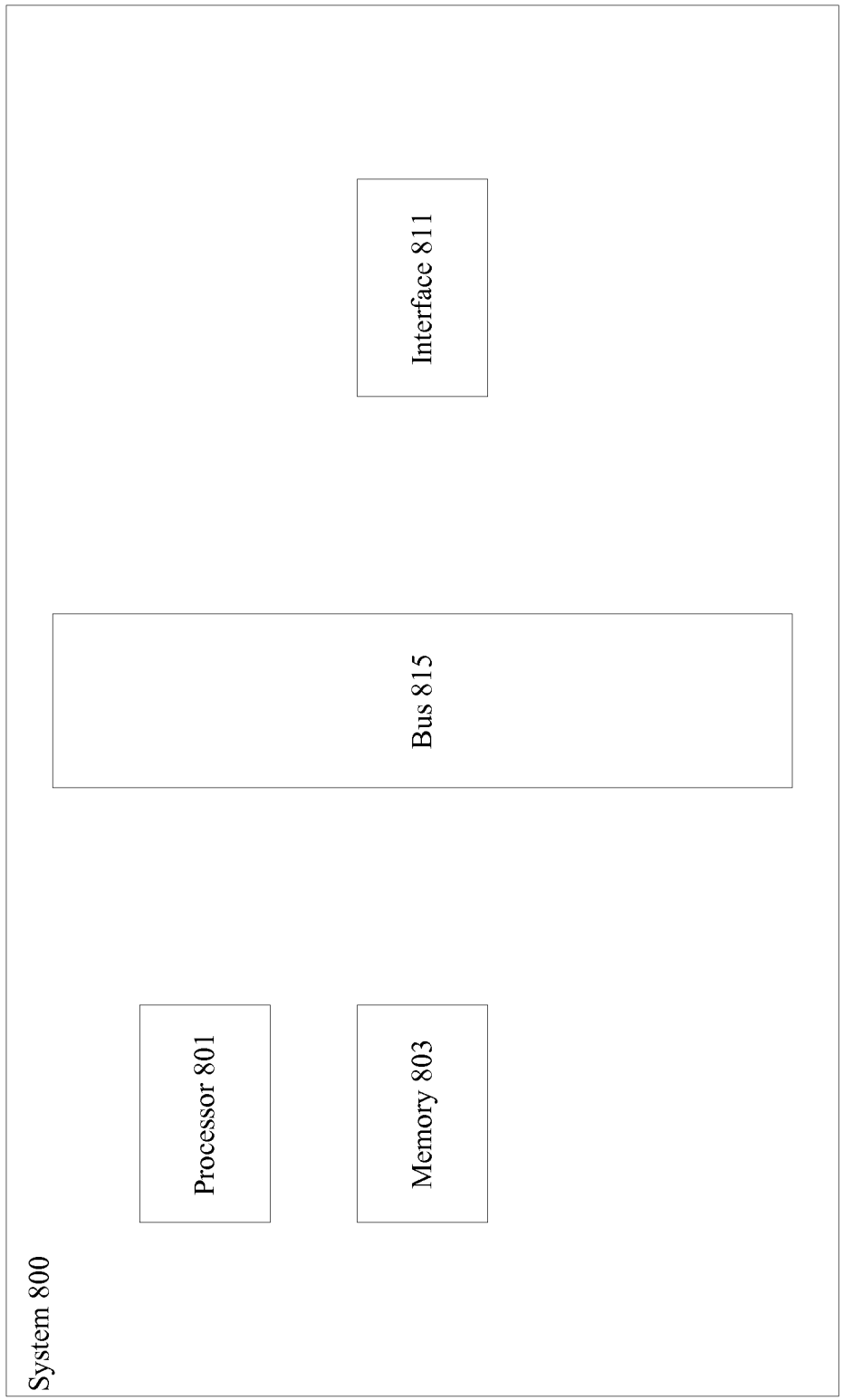

SCALABLE MECHANISM FOR DETECTION OF COMMONALITY IN A DEDUPLICATED DATA SET

TECHNICAL FIELD

The present disclosure relates to detecting commonality in a deduplicated data set.

DESCRIPTION OF RELATED ART

Maintaining vast amounts of data is resource intensive not just in terms of the physical hardware costs but also in terms of system administration and infrastructure costs. Some mechanisms allow compression of data to save on resources. For example, some file formats such as the Portable Document Format (PDF) are compressed. Some other utilities allow compression on an individual file level in a relatively inefficient manner.

Data deduplication refers to the ability of a system to eliminate data duplication across files to increase storage, transmission, and/or processing efficiency. A storage system which incorporates deduplication technology involves storing a single instance of a data segment that is common across multiple files. In some examples, data sent to a storage system is segmented in fixed or variable sized segments. Each segment is provided with a segment identifier (ID), such as a digital signature or the actual data. Once the segment ID is generated, it can be used to determine if the data segment already exists in the system. If the data segment does exist, it need not be stored again. The reference count for the single instance data segment is incremented and some form of file mapping construct is used to associate the deduplicated segment from a particular file to the single instance stored in the storage system.

However, mechanisms for determining commonality in a deduplicated data set are limited. Consequently, mechanisms are provided for improving the ability to determine commonality in a deduplicated data set.

BRIEF DESCRIPTION OF THE DRAWINGS

The disclosure may best be understood by reference to the following description taken in conjunction with the accompanying drawings, which illustrate particular embodiments of the present invention.

FIG. 1 illustrates a particular example of files and data segments.

FIG. 2A illustrates a particular example of a filemap.

FIG. 2B illustrates a particular example of a datastore suitcase.

FIG. 3A illustrates a particular example of a filemap.

FIG. 3B illustrates a particular example of a datastore suitcase.

FIG. 4A illustrates another example of a filemap.

FIG. 4B illustrates another example of a datastore suitcase.

FIG. 8 illustrates a particular example of a computer system.

DESCRIPTION OF PARTICULAR EMBODIMENTS

Figure 5:
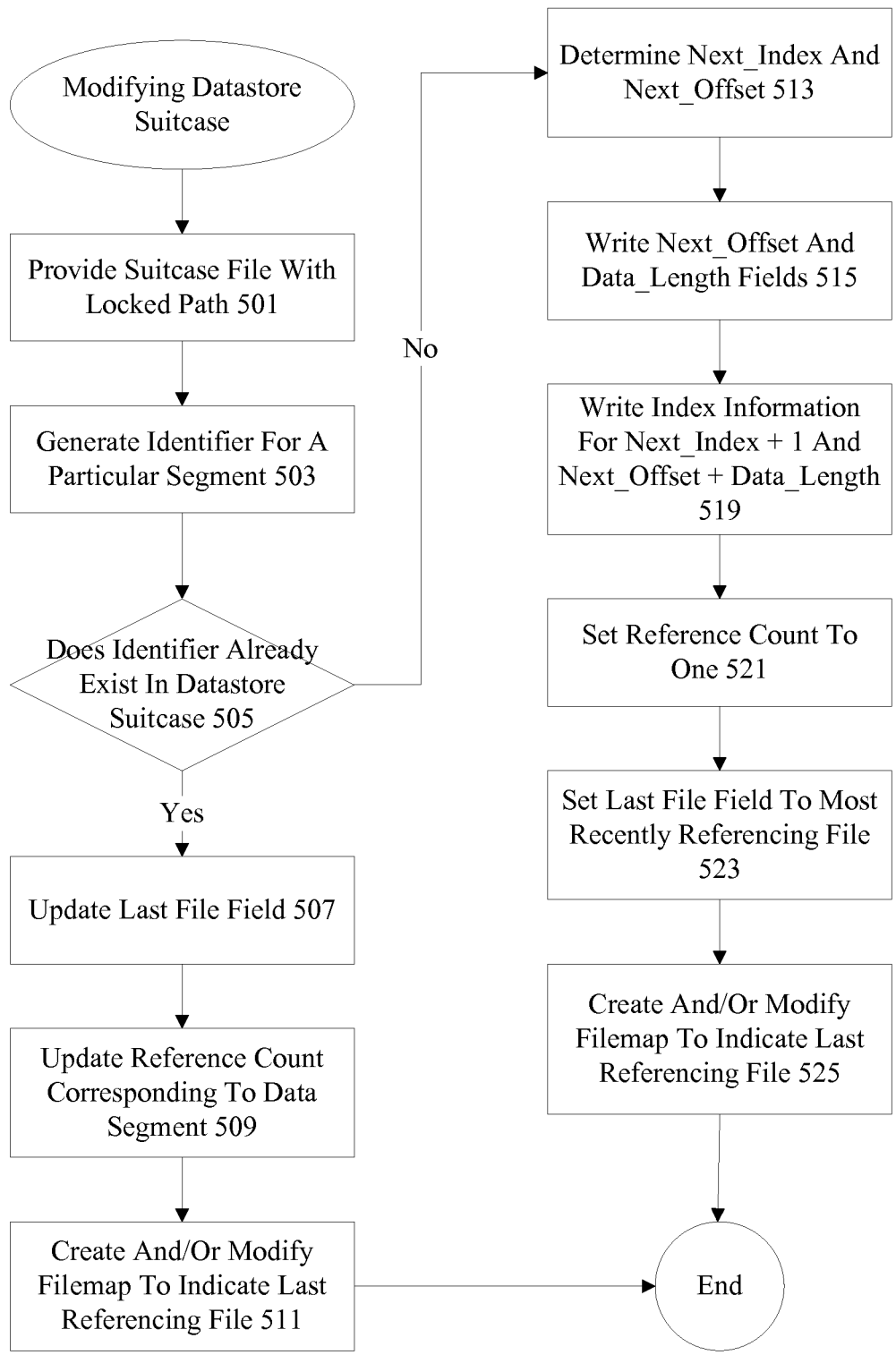
FIG. 5 illustrates a technique for modifying a datastore suitcase.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular types of data. However, it should be noted that the techniques and mechanisms of the present invention apply to a variety of different types of data and data formats. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided for efficiently determining commonality in a deduplicated data set in a scalable manner regardless of the number of deduplicated files or the number of stored segments. Information is generated and maintained during deduplication to allow scalable and efficient determination of data segments shared in a particular file, other files sharing data segments included in a particular file, the number of files sharing a data segment, etc. Data need not be expanded or uncompressed. Deduplication processing can be validated and verified during commonality detection.

Example Embodiments

Maintaining, managing, transmitting, and/or processing large amounts of data can have significant costs. These costs include not only power and cooling costs but system maintenance, network bandwidth, and hardware costs as well.

Some efforts have been made to reduce the footprint of data maintained by file servers. A variety of utilities compress files on an individual basis prior to writing data to file servers. Although individual file compression can be effective, it often provides inefficient compression. Decompression is also not particularly efficient. Other mechanisms include data deduplication. In a file server system, deduplication is hidden from users and applications. Data deduplication reduces storage footprints by reducing the amount of redundant data.

According to various embodiments, an optimization tool can aggressively compress and deduplicate files based on characteristics of particular files and file types as well as based on characteristics across multiple files. According to various embodiments, any processed file that may be smaller, more efficiently read and transmitted, and/or more effectively stored than a non-processed file is referred to herein as an optimized file. Any individual file or portion of the individual file that is processed to increase the storage efficiency of the file is referred to herein as a compressed file. Any file associated with a group of files that are processed to increase the storage efficiency of the group of files is referred to herein as a deduplicated file. That is, instead of simply optimizing a single file, multiple files can be optimized efficiently. It should be noted that a deduplicated file is not necessarily compressed and a compressed filed is not necessarily deduplicated, but an optimized file can be compressed and/or deduplicated.

Optimization may involve identifying variable or fixed sized segments. According to various embodiments, each segment of data is processed using a hash algorithm such as MD5 or SHA-1. This process generates a unique ID, hash, or reference for each segment. That is, if only a few bytes of a document or presentation are changed, only changed portions are saved. In some instances, deduplication searches for matching sequences using a fixed or sliding window and uses references to matching sequences instead of storing the matching sequences again.

In particular embodiments, it may be useful to determine what files share common segments and to determine the exact number of segments that are common. The extent of commonality can be complex when accounting for writes and modifies of huge amounts of data. In particular embodiments, it may be difficult to scale a mechanism for commonality detection. According to various embodiments, mechanisms are provided to readily determine segment commonality across multiple files in a deduplicated system in a scalable manner regardless of the number of deduplicated files or the number of stored segments. In particular embodiments, various mechanisms are provided to check the integrity of the deduplication logic.

According to various embodiments, techniques and mechanisms are provided to determine segment commonality by maintaining commonality information while deduplication is occurring. In particular embodiments, when deduplication logic or an optimizer processes files, a datastore suitcase and on-disk filemaps are created. The datastore suitcase includes the actual deduplicated data, reference counts tracking the entities sharing the deduplicated data, indices, offsets to determine the location of the data in originating files, and also fields for identifying the last file that has been optimized. It should be noted that optimization increments the reference count for the segment.

In particular embodiments, each file is provided with a filemap. The filemap includes an offset identifying where a segment came from, a segment location indicating where a segment can be found such as in a datastore suitcase, and also includes a reference identifying the previous file that caused the reference count for the segment to be incremented. By traversing various filemaps to determine where a segment was last referenced, a user can determine all files that placed a reference on the data segment. In particular embodiments, file commonality characteristics can be determined without reading actual data. This can provide a number of benefits particularly in systems handling large amounts of data.

FIG. 1 illustrates examples of files and data segments. According to various embodiments, file X 101 includes data A, data B, and data C. File Y 103 includes data D, data B, and data C. File Z 105 includes data D, data B, and data E. According to various embodiments, each data segment is 8K in size. The three files include five different segments A, B, C, D, and E. Files X 101, Y 103, and Z 105 can be deduplicated to remove redundancy in storing the different segments. For example, data B need only be stored once instead of three times. Data C and data D need only be stored once instead of twice. The techniques and mechanisms of the present invention recognize that common segments are determined during deduplication. Commonality characteristics and information can be maintained to allow efficient determination of segment commonality after deduplication.

FIG. 2A illustrates one example of a filemap and FIG. 2B illustrates a corresponding datastore suitcase created after optimizing a file X. Filemap file X 201 includes offset 203, index 205, and lname 207 fields. According to various embodiments, each segment in the filemap for file X is 8K in size. In particular embodiments, each data segment has an index of format <Datastore Suitcase ID>. <Data Table Index>. For example, 0.1 corresponds to suitcase ID 0 and datatable index 1. while 2.3 corresponds to suitcase ID 2 and database index 3. The segments corresponding to offsets 0K, 8K, and 16K all reside in suitcase ID 0 while the data table indices are 1, 2, and 3. The lname field 207 is NULL in the filemap because each segment has not previously been referenced by any file.

FIG. 2B illustrates one example of a datastore suitcase corresponding to the filemap file X 201. According to various embodiments, datastore suitcase 271 includes an index portion and a data portion. The index section includes indices 253, data offsets 255, and data reference counts 257. The data section includes indices 253, data 261, and last file references 263. According to various embodiments, arranging a data table 251 in this manner allows a system to perform a bulk read of the index portion to obtain offset data to allow parallel reads of large amounts of data in the data section. According to various embodiments, datastore suitcase 271 includes three offset, reference count pairs which map to the data segments of the filemap file X 201. In the index portion, index 1 corresponding to data in offset-data A has been referenced once. Index 2 corresponding to data in offset-data B has been referenced once. Index 3 corresponding to data in offset-data C has been referenced once. In the data portion, index 1 includes data A and a reference to File X 201 which was last to place a reference on the data A. Index 2 includes data B and a reference to File X 201 which was last to place a reference on the data B. Index 3 includes data C and a reference to File X 201 which was last to place a reference on the data C.

FIG. 3A illustrates file maps for two different files. Filemap file X 301 includes offset 303, index 305, and lname 307 fields. According to various embodiments, each segment in the filemap for file X is 8K in size. The segments corresponding to offsets 0K, 8K, and 16K all reside in suitcase ID 0 while the data table indices 1, 2, and 3. The lname field 207 is NULL in the filemap because each segment has not previously been referenced by any file.

Filemap file Y 311 includes offset 313, index 315, and lname 317 fields. According to various embodiments, each segment in the filemap for file X is 8K in size. The segments corresponding to offsets 0K, 8K, and 16K all reside in suitcase ID 0 while the data table indices include 4, 2, and 3. The lname field 317 is NULL in the filemap for offset 0K corresponding to index 0.4 because the segment has not previously been referenced by any file. However, the lname field 317 for offsets 8K and 16K corresponding to indices 0.2 and 0.3 have been referenced before by file X 301.

FIG. 3B illustrates one example of a datastore suitcase for file X 301 and file Y 311. According to various embodiments, datastore suitcase 371 includes an index portion and a data portion. The index section includes indices 353, data offsets 355, and data reference counts 357. The data section includes indices 353, data 361, and last file references 363. According to various embodiments, arranging a data table 351 in this manner allows a system to perform a bulk read of the index portion to obtain offset data to allow parallel reads of large amounts of data in the data section.

Index 0.1 corresponding to Data A is referenced by only file X 301. The reference count remains set at 1 and the last file 363 remains file X 301. Index 0.2 corresponding to Data B is referenced by file Y 311. The reference count is incremented to two and the last file field 363 is set to file Y 311. Index 0.3 corresponding to Data C is referenced by file X 301 and by file Y 303. The reference count remains set at 1 and the last file 363 remains file Y 303. Index 0.4 corresponding to Data D is reference by file Y 311. The reference count is set to 1 and the last file 363 field is set to file Y 311.

According to various embodiments, since only the 1st data segment in file Y 311 is different from file X 301, only one additional entry for segment Data D is added to the Data Table 351. The reference counts for Data B and Data C are incremented since these data segments are common to file X 301 and file Y 311. Additionally, the lnames in the datastore suitcase for the last reference of Data C and Data B are changed to file Y 311. The last file reference for Data A remains file X 301 because Data A is not in file Y 311. Prior to overwriting the lnames in the Datastore, they are captured in the filemap of file Y 311.

FIG. 4A illustrates file maps for three different files. Filemap file X 401 includes offset 403, index 405, and lname 407 fields. According to various embodiments, each segment in the filemap for file X is 8K in size. The segments corresponding to offsets 0K, 8K, and 16K all reside in suitcase ID 0 while the data table indices 1, 2, and 3. The lname field 207 is NULL in the filemap because each segment has not previously been referenced by any file.

Filemap file Y 411 includes offset 413, index 415, and lname 417 fields. According to various embodiments, each segment in the filemap for file Y is 8K in size. The segments corresponding to offsets 0K, 8K, and 16K all reside in suitcase ID 0 while the data table indices include 4, 2, and 3. The lname field 417 is NULL in the filemap for offset 0K corresponding to index 0.4 because the segment has not previously been referenced by any file. However, the lname field 417 for offsets 8K and 16K corresponding to indices 0.2 and 0.3 have been referenced before by file X 401.

Filemap file Z 421 includes offset 423, index 425, and lname 427 fields. According to various embodiments, each segment in the filemap for file Z is 8K in size. The segments corresponding to offsets 0K, 8K, and 16K all reside in suitcase ID 0 while the data table indices include 4, 2, and 5. The lname field 427 is NULL in the filemap for offset 16K corresponding to index 0.5 because the segment has not previously been referenced by any file. However, the lname field 427 for offsets 0K and 8K corresponding to indices 0.4 and 0.2 have been referenced before by file Y 411.

FIG. 4B illustrates one example of a datastore suitcase for file X 401, file Y 411, and file Z 421. According to various embodiments, datastore suitcase 471 includes an index portion and a data portion. The index section includes indices 453, data offsets 455, and data reference counts 457. The data section includes indices 453, data 461, and last file references 463. According to various embodiments, arranging a data table 451 in this manner allows a system to perform a bulk read of the index portion to obtain offset data to allow parallel reads of large amounts of data in the data section.

Index 0.1 corresponding to Data A is referenced only by file X 401. The reference count remains set at 1 and the last file 463 remains set to file X 401. Index 0.2 corresponding to Data B is referenced by all three files 401, 411, and 421 and consequently has a reference count incremented to three and a last file 463 field set to file Z 421. Index 0.3 corresponding to Data C is referenced by two files, file X 401 and file Y 411. The reference count remains set at two and the last file 463 field remains set to file Y 411. Index 0.4 corresponding to Data D is referenced by two files, file Y 411 and file Z 421. The reference count is incremented to two and the last file 463 field is set to file Z 421. Index 0.5 corresponding to Data E is referenced only by file Z 421. The reference count is set to one and the last file 463 field is set to file Z 421.

According to various embodiments, since only the 1st data segment in file Z 411 is different from the segments in file X 401 and file Y 411, only one additional entry for segment Data E is added to the Data Table 451. The reference counts for Data B and Data D are incremented since these data segments are common to file X 401 and file Y 411. Additionally, the lnames in the datastore suitcase for the last reference of Data B and Data D are changed to file Z 421. The last file reference for Data A remains file X 401 because Data A is not in file Z 421. The last file reference for Data C remains file Y 411 because Data C is not in file Z 421. Prior to overwriting the lnames in the datastore 471, they are captured in the filemap of file Z 421.

FIG. 5 illustrates a technique for modifying a datastore suitcase. At 501, a datastore suitcase with a locked path is provided for a particular file having one or more data segments. According to various embodiments, the suitcase file path is locked and the suitcase file itself is opened. If the suitcase file does not exist, a file such as sc.ofs is created. In particular examples, only one active suitcase file is permitted per directory per optimizer process. At 503, an identifier for a particular segment is generated and evaluated to determine if the identifier already exists in the datastore suitcase at 505. In particular embodiments, the identifier is a hash or a portion of the data segment itself. If the identifier already exists in the datastore suitcase, the last file field is updated to indicate the most recent file having the segment at 507. The reference count corresponding to the data segment is incremented at 509. A filemap for the file is created and/or modified to indicate what file has last referenced the segment at 511.

If the identifier does not already exist in the datastore suitcase, the next_index and next_offset are determined from the suitcase file at 513. At 515, the next_offset and data_length fields are written into the data_length and data_info fields for the file at the next_index 505 value. At 519, index information is written for next_index+1 and next_offset+data_length. A new data segment is added to suitcase A, the reference count is set to 1 at 521, and a last file field is set to the most recently referencing file at 523. A filemap for the file is created and/or modified to indicate what file has last referenced the segment at 525.

Figure 6:
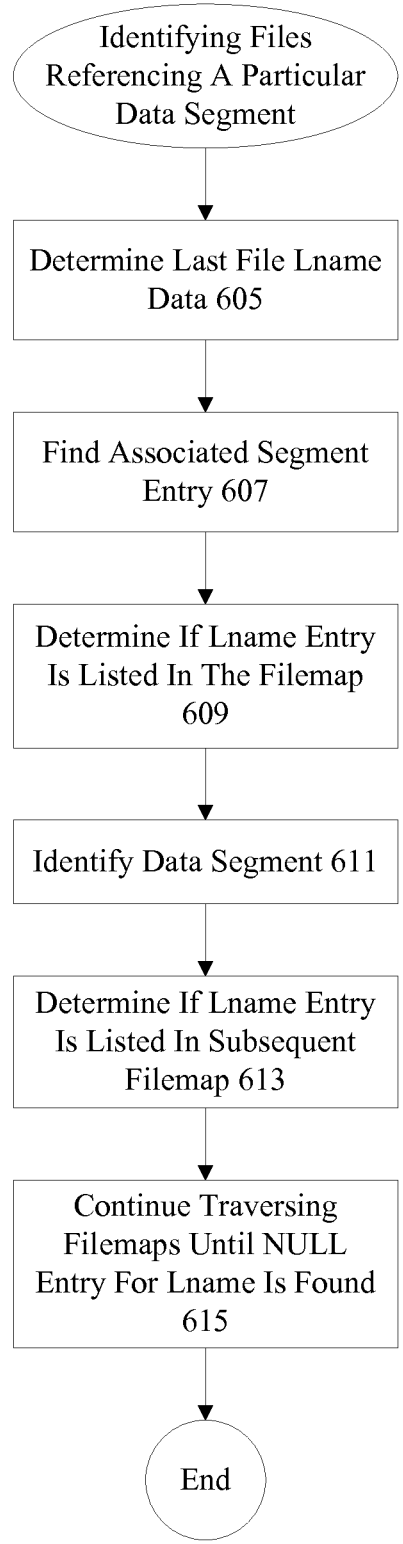
FIG. 6 illustrates a technique for identifying files that reference a particular data segment.

FIG. 6 illustrates a technique for identifying all files that reference a particular data segment. There are two approaches to identifying a data segment. The first approach is to open a suitcase file and sequentially access all of the data segments within the suitcase. Another approach may involve generating a hash or other identifier of a data segment and comparing hash values. The last file lname data associated with the data segment in the datastore suitcase is determined at 605. The lname links back to the filemap, where the associated segment entry can be readily found at 607. If there is an lname entry listed in the filemap, it means at least one file is in common 609. The filemap for the listed lname can be found and the data segment in question identified at 611. If there is no lname listed in the subsequent entry, the list is terminated which means there are two files that share the data segment at 613. According to various embodiments, the logic involves following the lnames at 615 until the filemap which holds a NULL entry for the lname is found.

Figure 7:
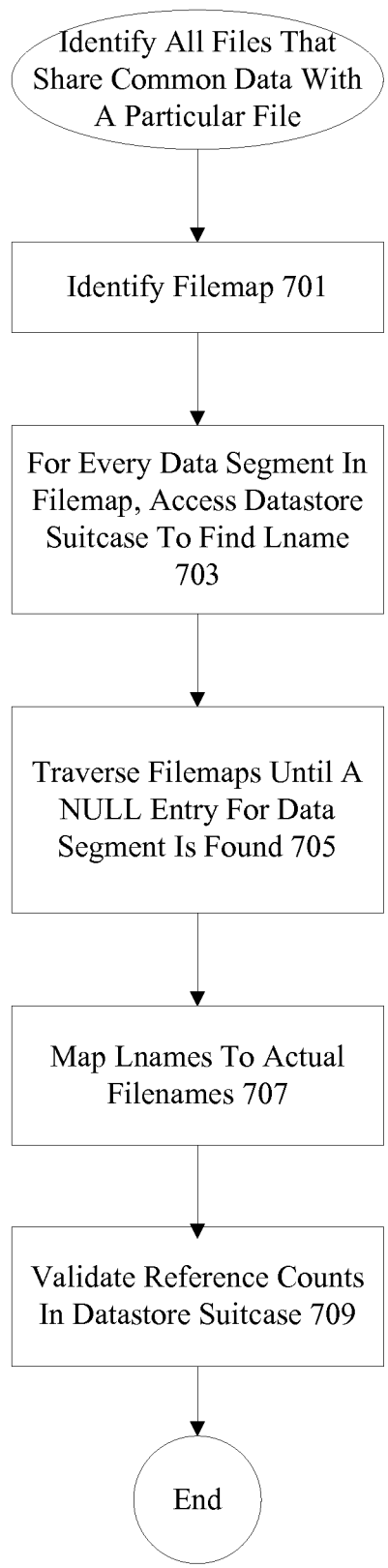
FIG. 7 illustrates a mechanism for identify files that share common data with a particular file.

FIG. 7 illustrates a technique identifying all of the files that share common data with a particular file. According to various embodiments, a filemap for a particular file is identified at 701. The filemap for the file is examined and for every data segment, the datastore suitcase is accessed to find the lname for the last reference file at 703. The filemaps are traversed at 705 until a NULL entry for the data segment is found. The lnames which can be mapped to the actual filenames are recorded at 707 for every filemap that has the data segment with an lname listed. Additionally, when the information about file commonality is collected, the reference counts in the datastore suitcase can be readily validated at 709.

A variety of devices and applications can implement particular examples of commonality determination. FIG. 8 illustrates one example of a computer system. According to particular example embodiments, a system 800 suitable for implementing particular embodiments of the present invention includes a processor 801, a memory 803, an interface 811, and a bus 815 (e.g., a PCI bus). When acting under the control of appropriate software or firmware, the processor 801 is responsible for such tasks such as optimization. Various specially configured devices can also be used in place of a processor 801 or in addition to processor 801. The complete implementation can also be done in custom hardware. The interface 811 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 800 uses memory 803 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
   generating a filemap corresponding to a deduplicated file using a processor included in a deduplication system, the filemap including a plurality of filemap indices, a plurality of offsets to identify a plurality of data segments in the deduplicated file, and a plurality of entries identifying last files having placed a reference to corresponding data segments in the deduplicated file;
   modifying a datastore suitcase, the datastore suitcase including an index portion and a data portion, the data portion holding a plurality of datastore indices corresponding to the filemap indices, a plurality of deduplicated data segments, and a last file entry identifying last files having placed a reference to deduplicated data segments, wherein the datastore suitcase is created when the processor processes a file for deduplication.

2. The method of claim 1, wherein a first file has a first filemap with a NULL lname entry corresponding to a first data segment if the first deduplicated file was the last file to have placed a reference to the first data segment.

3. The method of claim 1, wherein the datastore suitcase further comprises a plurality of reference counts corresponding to a plurality of deduplicated data segments.

4. The method of claim 1, wherein the reference counts correspond to the number of files sharing corresponding deduplicated data segments.

5. The method of claim 1, wherein files sharing a particular data segment can be determined by accessing the last file entry for the particular data segment and traversing referencing filemaps until NULL entries are identified.

6. The method of claim 5, wherein filenames corresponding to lnames are identified.

7. The method of claim 1, wherein all files having data segments in common with a particular file are identified by analyzing a filemap for the particular file and identifying last file entries in the datastore suitcase for the data segments in the particular file.

8. The method of claim 1, wherein referencing filemaps are traversed until NULL entries are identified.

9. A system, comprising:
   a deduplication system processor configured to generate a filemap corresponding to a deduplicated file, the filemap including a plurality of filemap indices, a plurality of offsets to identify a plurality of data segments in the deduplicated file, and a plurality of entries identifying last files having placed a reference to corresponding data segments in the deduplicated file;
   a storage device configured to hold a datastore suitcase modified by the deduplication system processor, the datastore suitcase including an index portion and a data portion, the data portion holding a plurality of datastore indices corresponding to the filemap indices, a plurality of deduplicated data segments, and a last file entry identifying last files having placed a reference to deduplicated data segments, wherein the datastore suitcase is created when the deduplication system processor processes a file for deduplication.

10. The system of claim 9, wherein a first file has a first filemap with a NULL lname entry corresponding to a first data segment if the first deduplicated file was the last file to have placed a reference to the first data segment.

11. The system of claim 9, wherein the datastore suitcase further comprises a plurality of reference counts corresponding to a plurality of deduplicated data segments.

12. The system of claim 9, wherein the reference counts correspond to the number of files sharing corresponding deduplicated data segments.

13. The system of claim 9, wherein files sharing a particular data segment can be determined by accessing the last file entry for the particular data segment and traversing referencing filemaps until NULL entries are identified.

14. The system of claim 13, wherein filenames corresponding to lnames are identified.

15. The system of claim 9, wherein all files having data segments in common with a particular file are identified by analyzing a filemap for the particular file and identifying last file entries in the datastore suitcase for the data segments in the particular file.

16. The system of claim 9, wherein referencing filemaps are traversed until NULL entries are identified.

17. A non-transitory computer readable medium having computer code embodied therein, the computer readable medium, comprising:

computer code for generating a filemap corresponding to a deduplicated file using a processor included in a deduplication system, the filemap including a plurality of filemap indices, a plurality of offsets to identify a plurality of data segments in the deduplicated file, and a plurality of entries identifying last files having placed a reference to corresponding data segments in the deduplicated file;

computer code modifying a datastore suitcase, the datastore suitcase including an index portion and a data portion, the data portion holding a plurality of datastore indices corresponding to the filemap indices, a plurality of deduplicated data segments, and a last file entry identifying last files having placed a reference to deduplicated data segments, wherein the datastore suitcase is created when the processor processes a file for deduplication.

18. The computer readable medium of claim 17, wherein a first file has a first filemap with a NULL lname entry corresponding to a first data segment if the first deduplicated file was the last file to have placed a reference to the first data segment.

19. The computer readable medium of claim 17, wherein the datastore suitcase further comprises a plurality of reference counts corresponding to a plurality of deduplicated data segments.

20. The computer readable medium of claim 17, wherein the reference counts correspond to the number of files sharing corresponding deduplicated data segments.

* * * * *